United States Patent [19]

Marchand et al.

[11] 4,115,303
[45] Sep. 19, 1978

[54] METHOD OF FABRICATION OF POROUS MACROMOLECULAR MATERIALS HAVING AN INTERNAL LINING AND MATERIALS OBTAINED BY MEANS OF SAID METHOD

[75] Inventors: Joseph Marchand, Choisy-le-Roi; Jean-René Puig, Sevres, both of France

[73] Assignee: Commissariat a l'Energie Atomique, Paris, France

[21] Appl. No.: 689,207

[22] Filed: May 24, 1976

Related U.S. Application Data

[63] Continuation of Ser. No. 349,490, Apr. 9, 1976, abandoned.

[30] Foreign Application Priority Data

Apr. 21, 1972 [FR] France .............................. 7214293

[51] Int. Cl.² .......................... C08J 9/00; C08F 2/46
[52] U.S. Cl. .................... 521/53; 210/500 M; 204/159.12; 204/159.14; 204/159.15; 204/159.19; 204/159.2; 204/159.17; 521/61; 521/30
[58] Field of Search ............ 204/159.17; 260/2.5 HA, 260/2.5 R

[56] References Cited

U.S. PATENT DOCUMENTS

| | | | |
|---|---|---|---|
| 3,298,942 | 1/1967 | Magat et al. | 204/159.17 |
| 3,390,067 | 6/1968 | Miller et al. | 204/159.17 |
| 3,392,096 | 7/1968 | Lawton et al. | 204/159.17 |
| 3,442,780 | 5/1969 | Levine | 204/159.17 |
| 3,607,692 | 9/1971 | Sanner et al. | 204/159.17 |
| 3,666,693 | 5/1972 | Chapiro et al. | 204/159.17 |
| 3,714,083 | 1/1973 | Nakayama et al. | 204/159.17 |
| 3,717,559 | 2/1973 | Oyama et al. | 204/159.17 |
| 3,816,284 | 6/1974 | Kagiya et al. | 204/159.17 |

*Primary Examiner*—Harald D. Anderson
*Attorney, Agent, or Firm*—Ernest F. Marmorek

[57] ABSTRACT

The method of fabrication of porous macromolecular materials which are primarily intended for use as ion-exchange membranes and selective semi-permeable membranes consists in subjecting a polymer to irradiation with heavy nuclear particles, in chemically fixing a monomer having at least one ethylene double bond in the zones which are modified by irradiation and localized around the locus of passage of each particle and in forming the pore structure by means of a chemical attacking agent which is specific to the starting polymer.

17 Claims, No Drawings

METHOD OF FABRICATION OF POROUS MACROMOLECULAR MATERIALS HAVING AN INTERNAL LINING AND MATERIALS OBTAINED BY MEANS OF SAID METHOD

This is a continuation of application Ser. No. 349,490, filed Apr. 9, 1976, now abandoned.

This invention relates to a method of fabrication of a porous macromolecular material having internal lined micro-ducts and especially intended for use as an ion-exchange membrane or as a selective semi-permeable membrane. It has been endeavored in some techniques of the prior art to utilize the phenomenon in which a polymer film subjected to irradiation undergoes certain modifications, in particular the formation of micro-ducts within the thickness of the film, with the result that a porous structure can be obtained to a certain extent.

The method according to the invention corresponds to technical requirements more effectively than comparable methods which have been employed up to the present time, especially insofar as it utilizes the particular effects of heavy ionizing particles on polymer films and produces a chemical modification in the porosity zones which are formed.

It is known that the action of heavy ionizing particles is such that tracks are formed on polymer sheets. The number of particles which have interacted with the polymer is determined by counting the particle tracks. However, it is necessary to develop these tracks by extracting that portion of the polymer which has been severely damaged by the ionizing particles by means of a compound such as a base or an oxidizer. The possibility of developing the track is related to the quantity of energy lost by the particle per path-length unit $dE/dX$ in the starting polymer. Development is possible to a first-order approximation only above a critical value $(dE)/dX$, depending on the characteristics of the polymer and of the particles, and also on the type of developer employed. Thus, the fission fragments associated with developers such as NaOH, . . . $KMnO_4$ make it possible to count the number of tracks on the majority of polymers. However, in the case of less effective heavy particles and certain polymers, the following energy thresholds can be considered: 0.2 MeV per micron in the case of cellulose compounds, and 2 MeV per micron in the case of a polyester such as ethylene glycol polyterephthalate (terphane). By way of example, it is possible to develop the fission fragments of U-235 on a sheet of polycarbonate after reaction with 6 N Sodium hydroxide at 60° C. for a period of a few minutes. The same applies to the cellulose compounds. However, the tracks of α-particles of a few MeV energy which have interacted with a polyester film (terphane) cannot be counted after passage through the 6 N sodium hydroxide solution at 60° C. whereas the tracks of fragments of Cf-252 will be visible. On the other hand, two types of tracks are observed on a film of cellulose triacetate.

Polycarbonate films which have thus been irradiated and developed and contain pores 5μ in diameter have been employed as filters for carrying out biological separations.

In accordance with a method described in French Pat. No. 1,560,422 filed on Jan. 10th, 1968 in the name of General Electric Company, this phenomenon is employed in the fabrication of small elements distributed within a selected matrix, which consists in obtaining a porous membrane by irradiation of a matrix and in filling the pores thus formed with a metallic compound.

In order to fabricate ion-exchange membranes, it is known to produce a copolymer by radiochemical grafting which is essentially performed by means of electromagnetic radiations (X-rays, γ-rays) and electron radiations. This method is described in French Pat. No. 1,237,742 of May 25th, 1959 in the name of American Machine and Foundry Company. The copolymers obtained in this method are homogeneous. The effects obtained are observed throughout the irradiated zone.

The method according to the invention has an advantage in that the different characteristics of the prepared porous macromolecular material can be adjusted as a function of the application which is contemplated.

The method which forms the subject of the invention is primarily characterized in that a polymer is subjected to irradiation with heavy nuclear particles, a monomer having at least one ethylene double bond is fixed chemically in the zones which are modified by irradiation and localized around the locus of passage of each particle and the pore structure is formed by means of a chemical attacking agent which is specific to the starting polymer.

The essential advantage of the method under consideration lies in the action of the heavy particle at its point of impact and in the immediately adjacent region, with the result that localized effects can accordingly be obtained.

In point of fact, heavy nuclear particles release a large quantity of energy as they travel through materials. Moreover, the paths which they follow within materials such as polymers are practically rectilinear. It is known that the passage of a heavy particle through the material causes the formation of a large quantity of secondary electrons, said electrons being projected at distances which are variable according to their energies from the locus of passage of the particle. There is therefore obtained a cylinder of secondary interactions, the axis of which is the locus of passage of the particle. In the immediate vicinity of said axis and in the zone delimited by a cylinder having a diameter of a few A, the effects are sufficient to cause local degradation of the material.

In the central portion of the zone which is delimited by said first cylinder, the extent of the effects is such that the damaged material reacts more strongly to the action of a chemical attacking agent which is specific to said material and that a pore structure can thus be formed. The desired pore diameter can be obtained by regulating the extent of chemical attack, taking account of the irradiated material and the characteristics of the particle.

In the zone formed between the first cylinder and a second cylinder whose diameter is limited by the range of the secondary electrons, said secondary electrons initiate the formation of active sites. Said active sites can then be employed for starting the polymerization of a monomer which has diffused within the material and it is thus possible to fabricate a grafted copolymer which is localized around the locus of passage of the particle. The monomer can be chosen as a function of the application which is contemplated for the porous macromolecular material.

In accordance with one characteristic feature of the invention, the polymer is irradiated in the presence of the monomer which has at least one ethylene double bond. In this case, either the monomer is contained in the polymer as a result of impregnation or the monomer is in the state of vapor within the irradiation enclosure.

In accordance with a further characteristic feature of the invention, the polymer alone is first irradiated and the monomer is then grafted. Irradiation is carried out in a medium which may or may not contain oxygen.

The heavy particles which can be employed in the method according to the invention arise from α-radiation (for example the radiation produced by a source of Americium-241), the radiation produced by fission fragments (for example Californium-252), the heavy radiation delivered by particle accelerators (protons, helium ions, oxygen ions, sulphur ions, argon ions and so forth). Reactions such as (n,α) can also be produced in a nuclear reactor; for example, the fission fragments of U-235 bombarded by thermal neutrons can be employed.

One of the advantages of heavy particles is the limited range of these latter; they therefore require practically no shielding when they are employed alone. Thus, all the α-radiations of a few MeV are absorbed by a maximum thickness of polymer of $50\mu$ and the fission fragments are absorbed by a thickness of less than $25\mu$.

In the method according to the invention, all thermosetting plastics can be employed as starting polymers. It is only necessary to associate with a given polymer, particles which are capable of providing at least $(dE/dX)$ critical. Thus, the cellulose polymers (regenerated cellulose, acetate, triacetate, cellulose acetobutyrate) are sensitive to particles ranging from α-particles to fission fragments. Polymers such as the polycarbonates are sensitive to oxygen ions having an energy of at least 30 MeV, whilst polyterephthalate is sensitive to sulphur ions having an energy of at least 30 MeV. The polyolefins are sensitive only to fission fragments (of 80 MeV energy). All the polymers including the mineral glasses, the micas, are sensitive to fission fragments.

The chemical attacking agent which is intended to form the pore structure can be either a base or an oxidizer, depending on the starting polymer employed, e.g. sodium hydroxide, potassium permanganate, potassium bichromate.

The choice of monomer to be grafted about each particle track so as to form a graft copolymer depends on the application which is contemplated. By way of nonlimitative example, mention can be made of vinyl-2-pyridine, acrylic acid, acrylonitrile, styrene.

In accordance with one advantageous feature of the invention, the copolymer, that is, the grafted monomer, which is localized about each track can be modified in a subsequent step, this modification being chosen as a function of the application which is contemplated. For example, it is possible to sulphonate fixed styrene, that is, to react styrene with a sulfonating agent to quaternize fixed vinyl-pyridine, and so forth. The grafted or fixed monomer is thus reacted with a chemical substance which adds a chemically reactive group thereto. The porous material which has thus been converted retains its initial properties. In fact, by reason of the localization of effects, the majority of the volume of the starting polymer is intact. Grafting is localized only in cylinders a few A in diameter about the axis which represents the path of the particle and from which the highly damaged portion has been extracted.

Moreover, depending on the thickness of the irradiated material and the range of the particle, it is possible to produce an effect throughout the thickness or an effect of limited depth.

Among the numerous applications of porous macromolecular materials obtained by means of the method according to the invention, mention can be made of their use as selective semi-permeable membranes, the active pores of these materials being capable of selecting molecules according to their size and their physico-chemical characteristics. These membranes can be employed in the processes of dialysis, ultra-filtration and hyperfiltration. The membranes obtained by means of the method according to the invention find an advantageous application in the biomedical field. For example, by means of the method, an anti-coagulant compound such as heparin can be fixed on one side of the membrane whether by means of a graft or not, and an enzyme such as urease can be fixed on the other side of said membrane; this can be applied to renal purification.

Another advantageous application of the method according to the invention is to fix compounds having different polarities at each end of the small ducts formed in the macromolecular material and to utilize the electrochemical effects thus produced on a series of membranes as thus constituted. This application can be used in particular for the construction of a series of microcells.

It should be noted that the localized action of each particle in the case of flux values of $10^6$ to $10^{11}$ particles per square centimeter utilizes only a very small percentage of the surface area. The remainder of the surface can be subjected to another type of treatment such as, for example, grafting which may or may not be of the radiochemical type and makes said surface hydrophilic. Depending on the geometry of the irradiation source, it is possible to produce action within the interior or on the exterior of tubes, flat surfaces or particles of any shape if, for example, they are subjected under vibration to irradiation with heavy nuclear particles.

Thus, the method according to the invention is particularly advantageous insofar as it permits the fabrication of porous macromolecular materials having given characteristics which are specific to the use which is contemplated for the material considered.

Whenever this should prove necessary, it is possible to modify the parameters on which these characteristics depend (starting polymer, particle selected, distance and duration of irradiation, extent of chemical attack, choice of monomer to be grafted, possible conversion of said monomer, and so forth) and thus to obtain a large number of different porous macromolecular materials. The invention has consequently a very broad field of application.

There are given hereunder by way of non-limitative example a few modes of fabrication of porous macromolecular materials in accordance with the invention:

EXAMPLE 1

A film of cellulose triacetate having a thickness of 125 microns and weighing 675.6 mg is exposed to 10 mm of a flat source of Americium-241 of 5.5 mCi and 50 cm² of surface area after having been impregnated with vinyl-2-pyridine. Irradiation takes place in an inert atmosphere; after 65 hours, the sheet is withdrawn. Its constant weight in the dry state is 709.0 mg. In this case of irradiation, the α-particles penetrate to a distance of only $30\mu$ within the cellulose triacetate which has a thickness of $125\mu$. A slightly brown zone corresponding to the irradiated portion is visible. Under the electron microscope, it is apparent that the irradiated portion has been extensively subjected to impacts. The sheet is then subjected to the action of 6 N NaOH at 60° C. for a period of 40 minutes; craters a few microns in diameter can be observed in the irradiated zone; the non-irradiated portions exhibit surface defects which are similar to those of a standard reference film.

The active porous material can be the location of an exchange and can be employed in purification or insulation processes. The material can also be placed on the inside of a tube or of a spherulite or alternatively on the outside of this latter so that a fixed compound can be delivered into the pores progressively in time. The quantity of pores is regulated by the activity of the source and the irradiation time.

EXAMPLE 2

Under conditions which are identical with those given in Example 1, a film of cellulose acetate (Rhodophane) having a thickness of 17 microns and therefore smaller than the range of the α-particles (30 microns) is irradiated and grafted. In contrast to Example 1, the film is not impregnated but contacted with vapors of vinyl-2-pyridine in a nitrogen medium. The weight gain is 8% of the initial weight of the film after 65 hours. After development of the impacts in 6 N NaOH at 40° C. for a period of three minutes, said impacts are visible without any mechanical modification or impairment of the film.

The mean impact diameter is in the vicinity of 1 micron. The electrical resistance of substitution of the membrane in a medium of 0.1 M NaCl is lower than 1 ohm.cm$^2$. Whether in the form of a selective porous membrane or in the form of a tube, this material is suitable for use in such processes as dialysis or selective filtration as applicable to the separation of proteins, for example.

EXAMPLE 3

Under conditions similar to Example 2, a film of polycarbonate (4,4-dioxydiphenyl-2,2-propane) which is commercialized under the trade name of Makrofol KG Bayer and has a thickness of 2 microns is irradiated in an inert atmosphere in the presence of vinyl-2-pyridine vapor with α-rays produced by a source of Americium-241. After 68 hours, the weight gain is 13% of the initial weight of the film. After ten minutes in a 6 N NaOH solution at 60° C., a large number of pores of the order of 1 micron in diameter are visible under the microscope. After development, the membrane is stable in an oxidizing medium and can be mounted either by bonding or clamping. Its mechanical strength remains similar to that of a standard reference.

EXAMPLE 4

In the case of a film which is identical with the film of Example 3 but in the presence of acrylic acid vapor, the grafting rate is 26%. After development of the tracks in 6 N NaOH at 60° C. for a period of twenty minutes, the electrical resistance of substitution in a medium of 0.1 M NaCl is lower than 1 ohm.cm$^2$.

The membrane which is formed is more fragile than in the previous example but can still be mounted on a frame.

EXAMPLE 5

Two superposed films of terphane having a thickness of 6μ are exposed: the first at a distance of 13 mm and the second at a distance of 13 mm plus 30 microns from a source of 0.5 μg of Californium-252 deposited on a disc 6 cm in diameter. The exposed portion of the films is a disc 5 cm in diameter.

Irradiation takes place in the surrounding air over a period of 67 hours and 30 minutes. The first film is divided into two halves, one of which is grafted by vinyl-2-pyridine in a degassed reaction vessel which is left for a period of 16 hours at 70° C. The weight gain is 3.5% of the weight of the initial half-film. Said half-film is then subjected to development with 6 N NaOH at 60° C. for a period of 10 minutes. The pores are visible under the microscope (160X). The electrical resistance of substitution is 170 ohms.cm$^2$ whereas the resistance of the initial film is 3 × 10$^6$ ohms.cm$^2$. The second ungrafted half is developed under the conditions described with NaOH; its electrical resistance is 70 ohms.cm$^2$.

The second film which is irradiated at 30 microns beyond the first is divided into two halves. The first half is grafted by the method herein described; the weight gain is 4.5%. After 15 minutes in the 6 N NaOH solution at 60° C., the electrical resistance is 600 ohms.cm$^2$. The second half is also developed over a period of only 15 minutes; its resistance is 1.5 × 10$^6$ ohms.cm$^2$. The parts which are shielded during the irradiation process behave as standard references with respect to the grafting process, that is to say negatively, and also with respect to the development process. It is therefore possible to make use of a membrane which is grafted and developed in a medium in which the physico-chemical characteristics such as pH, for example, will serve to adjust the expansion of the pore structure which is coated with the active polymer and thus result in separations based on selective filtration processes.

EXAMPLE 6

A terphane film of 6 microns is exposed at a distance of 12 mm from the source of Cf-252 described in Example 5, in an inert atmosphere and in the presence of vinyl-2-pyridine at room temperature. After 70 hours, the exposed zone (disc having a diameter of 5 cm) is distinctly opalescent. The weight gain of the film is 18.5% of the initial weight. After passing through 6 N NaOH at 60° C. for a period of 15 minutes, the electrical resistance of substitution is 30 ohms.cm$^2$. In the case of a film irradiated under the same conditions of geometry and time but in the presence of air, the irradiated zone is destroyed after 12 minutes. In the case of the grafted film, development becomes visible to the naked eye after 7 minutes of treatment whereas, under the same conditions on the reference film, the development appears after 3 minutes.

This example clearly brings out the effect of copolymerization and the advantage of this latter. The copolymer affords higher resistance to the track-developing attack while possessing ionizable groups. Quaternization by methyl iodide in an alcohol medium produces a strongly basic membrane having an open porosity and the mechanical properties of polyester. These membranes are applicable to the processes of electrodialysis in their different fields of use: desalination of water, biological purification, walls of dry cells and accumulators.

EXAMPLE 7

A sheet of cellulose triacetate 125 microns in thickness and impregnated with vinyl-2-pyridine is exposed to Cf-252 under the conditions of Example 6. After a period of 70 hours, the weight gain is 49.2 mg in addition to the initial gain of 1.4471 g. The opalescence already noted in Example 6 is observed in the grafted zone and on the polyester in the case of a disc having a diameter of 5 cm which was the portion exposed to radiation. However, even before the treatment with NaOH, craters having a diameter of less than 1 micron can be seen under the microscope. The number of said craters increases and their diameters range between 2 and 5 microns after attack by 6 N NaOH at 60° C. for a period of 40 min. This porous macromolecular compound in the zone subjected to radiation is suitable for the applications described in Example 1.

EXAMPLE 8

A film of polyvinyl chloride a polychloro polyolefin having a thickness of 20 microns is irradiated with fission fragments of uranium-235 for a period of 30 hours at a distance of 10 mm from the deposit of uranium of 12 $\mu$g. The film is stored for a period of 24 hours and then subjected to grafting in a degassed metallic vessel in the presence of pure acrylonitrile. The weight gain is 14% of the initial weight of the film after 3 hours at 80° C. The film is then immersed in a solution of KOH in alcohol; the tracks of approximately 0.1 micron in diameter are observable after 2 hours at 80° C. This type of copolymer can also be formed in a tube in order to serve as a separation barrier.

EXAMPLE 9

A tube of polypropylene having an external diameter of 1.22 mm and an internal diameter of 0.95 mm is exposed to the fission fragments at the time of bombardment of a deposit of uranium-235 by neutrons as in Example 8. The tube is then partially immersed in styrene in a closed and degassed metallic reaction vessel for a period of 8 hours at 80° C. Its weight gain in the immersed portion is 8% of the initial weight. After 30 minutes in a mixture consisting of 30 grams of potassium bichromate per 100 cm$^3$ of 16 N sulphuric acid, open pores are visible on the exterior of the tube, the mean diameter of which is 0.1 to 1 micron. The fixed polystyrene can be sulphonated by conventional methods and can thus result in a tubular material having a porous surface lined with a strong acid polymer attached by chemical linkage.

EXAMPLE 10

A film of 13 microns of polyimides commercialized under the trade name of "Kapton" by E. I. du Pont de Nemours & Company is exposed for a period of 16 hours at 10 mm from the source of Cf-252 as described earlier, in the presence of acrylic acid vapor in an inert gas medium. After the period of 16 hours, the weight gain is 3.5% of the weight of the initial film. The film is then immersed in a solution of 5% by weight of potassium permanganate; after 2 hours, the pores are visible under the microscope and the electrical resistance of substitution of the film in a 0.1 M NaCl medium is higher than 1 ohm.cm$^2$. The mean value of the pore density is 10$^8$ per cm$^2$.

What we claim is:

1. A method for producing porous macromolecular material from a polymer consisting of a polyolefin, comprising
    irradiating the polyolefin with heavy nuclear particles, whereby the polyolefin is modified in the region along the path of the nuclear particles to make it more reactive to attack in the region along the path by a chemical attacking agent selected from the group consisting of strong oxidizers and strong bases, and additionally to make it more reactive towards monomers having at least one ethylene double bond;
    reacting said modified polyolefin with said chemical attacking agent, whereby a portion of the modified polyolefin is removed forming a pore structure in and through said polyolefin; and
    reacting the polyolefin at the modified portion, with a monomer having at least one ethylene double bond, whereby the monomer is fixed to at least a portion of the modified polyolefin.

2. A method according to claim 1, wherein irradiation of the polyolefin is carried out in the presence of the monomer to be grafted.

3. A method according to claim 2, wherein the polyolefin has previously been impregnated with the monomer to be grafted prior to irradiation.

4. A method according to claim 1, wherein the monomer is in the state of vapor within the enclosure in which irradiation of the polyolefin is performed.

5. A method according to claim 1, wherein irradiation of the polyolefin is carried out in the absence of the monomer to be grafted, fixation of said monomer being carried out after the irradiation step.

6. A method according to claim 1, wherein the fixed monomer is reacted with a substance which adds a chemically active group thereto.

7. A method according to claim 6 wherein said fixed monomer is reacted with a sulfonating agent.

8. A method according to claim 1 wherein the heavy particles are constituted by $\alpha$-radiations.

9. A method according to claim 1, wherein the heavy particles are produced by fission fragments.

10. A method according to claim 1, wherein the heavy particles are produced by particle accelerators.

11. A method according to claim 1, wherein the particles are produced in a nuclear reactor by means of reactions such as $(n,\alpha)$.

12. A method according to claim 1, wherein said polyolefin is polypropylene.

13. A method according to claim 1, wherein said polyolefin is a polychloro polyolefin.

14. A method according to claim 13, wherein said polychloro polyolefin is polyvinyl chloride.

15. A method according to claim 1 wherein the monomer is selected from the group consisting of vinyl-2-pyridine, acrylic acid, acrylonitrile and styrene.

16. A method according to claim 1, wherein said polyolefin is polypropylene;
    the irradiating step comprising irradiation with fission fragments from 12 $\mu$g. of uranium 235 for about 30 hours at a distance of 10 mm;
    said chemical attacking agent consists essentially of a solution of 30 grams of potassium bichromate per 100 cm$^3$ of 16N sulfuric acid;
    said monomer consists essentially of styrene; and
    said styrene, when fixed to the polypropylene, is sulfonated.

17. A method according to claim 1, wherein said polyolefin is polyvinyl chloride having a thickness of 20 microns;
    the irradiating step comprises irradiation with fission fragments from 12 $\mu$g. of uranium 235 for about 30 hours at a distance of 10 mm;
    said chemical attacking agent is a solution of KOH in alcohol which acts on the polyvinyl chloride for about two hours;
    said monomer consists essentially of acrylonitrile.

* * * * *